US 9,148,674 B2

(12) United States Patent
Lipowski et al.

(10) Patent No.: US 9,148,674 B2
(45) Date of Patent: Sep. 29, 2015

(54) METHOD AND SYSTEM FOR ASSIGNING ANTENNAS IN DENSE ARRAY (71) Applicant: RPX Corporation, San Francisco, CA (US)

(72) Inventors: Joseph Thaddeus Lipowski, Norwell, MA (US); James Alan Bingham, Westerville, OH (US)

(73) Assignee: RPX Corporation, San Francisco, CA (US)

( * ) Notice: Subject to any disclaimer, the term of this patent is extended or adjusted under 35 U.S.C. 154(b) by 149 days.

(21) Appl. No.: 13/659,029

(22) Filed: Oct. 24, 2012

(65) Prior Publication Data

US 2013/0109295 A1    May 2, 2013

Related U.S. Application Data (60) Provisional application No. 61/551,756, filed on Oct. 26, 2011.

(51) Int. Cl.
*H04H 20/74* (2008.01)
*H04N 21/214* (2011.01)
*H04H 20/42* (2008.01)
*H04N 21/239* (2011.01)
(Continued)

(52) U.S. Cl.
CPC .......... *H04N 21/2143* (2013.01); *H01Q 1/523* (2013.01); *H04H 20/423* (2013.01); *H04N 21/2393* (2013.01); *H04N 21/2405* (2013.01); *H04N 21/4263* (2013.01); *H04N 21/4383* (2013.01); *H04N 21/43615* (2013.01); *H04N 21/64723* (2013.01)

(58) Field of Classification Search
CPC .................................................. H04N 21/2143
USPC ............ 455/3.02, 3.04, 13.3; 705/81, 82, 116
See application file for complete search history.

(56) References Cited

U.S. PATENT DOCUMENTS

| 4,721,960 | A | 1/1988 | Lait |
| 5,485,167 | A | 1/1996 | Wong et al. |

(Continued)

FOREIGN PATENT DOCUMENTS

| EP | 1895777 A1 | 3/2008 |
| JP | 2004-007592 A | 1/2004 |

(Continued)

OTHER PUBLICATIONS

International Search Report, mailed May 3, 2012, from International Application No. PCT/US2011/061232, filed Nov. 17, 2011.

(Continued)

*Primary Examiner* — Sanh Phu
(74) *Attorney, Agent, or Firm* — Houston & Associates, LLP (57) ABSTRACT

A method and system optimally selecting antenna elements based on the current availability of antenna elements and the current usage of other antenna elements within a two or three dimensional array. The present system and method pertain to an approach to allow the maximal usage of each antenna element while simultaneously reducing the coupling between antenna elements to improve the signal strength in each antenna element by ensuring that antenna elements in the same incident path are not tuned to the same frequency or physically or electrically near elements tuned to identical or adjacent frequencies.

16 Claims, 7 Drawing Sheets

(51) Int. Cl.
*H04N 21/24* (2011.01)
*H04N 21/426* (2011.01)
*H04N 21/436* (2011.01)
*H04N 21/438* (2011.01)
*H04N 21/647* (2011.01)
*H01Q 1/52* (2006.01)

(56) References Cited

U.S. PATENT DOCUMENTS

| | | | |
|---|---|---|---|
| 6,340,948 B1 | 1/2002 | Munoz-Garcia et al. | |
| 6,493,873 B1 | 12/2002 | Williams | |
| 6,754,907 B1 | 6/2004 | Schumacher et al. | |
| 6,871,081 B1 | 3/2005 | Llewellyn et al. | |
| 6,889,385 B1 * | 5/2005 | Rakib et al. | 725/119 |
| 7,109,919 B2 | 9/2006 | Howell | |
| 7,130,576 B1 | 10/2006 | Gurantz et al. | |
| 7,725,912 B2 * | 5/2010 | Margulis | 725/81 |
| 7,741,997 B1 | 6/2010 | Jacomb-Hood | |
| 7,813,766 B1 | 10/2010 | Lam | |
| 8,063,832 B1 | 11/2011 | Weller et al. | |
| 8,344,950 B2 | 1/2013 | Su | |
| 2002/0031224 A1 | 3/2002 | Basawapatna et al. | |
| 2002/0157112 A1 | 10/2002 | Kuhn | |
| 2003/0139980 A1 | 7/2003 | Hamilton | |
| 2003/0149988 A1 | 8/2003 | Ellis et al. | |
| 2003/0158913 A1 | 8/2003 | Agnoli et al. | |
| 2003/0181165 A1 | 9/2003 | Sugar et al. | |
| 2003/0192054 A1 | 10/2003 | Birks et al. | |
| 2003/0192055 A1 | 10/2003 | Aoki et al. | |
| 2003/0233580 A1 | 12/2003 | Keeler et al. | |
| 2004/0015992 A1 | 1/2004 | Hasegawa et al. | |
| 2004/0117834 A1 | 6/2004 | Karaoguz et al. | |
| 2004/0117846 A1 | 6/2004 | Karaoguz et al. | |
| 2004/0154040 A1 | 8/2004 | Ellis | |
| 2004/0193648 A1 | 9/2004 | Lai et al. | |
| 2004/0252243 A1 | 12/2004 | Stewart | |
| 2005/0022242 A1 | 1/2005 | Rosetti et al. | |
| 2005/0076375 A1 * | 4/2005 | Nakamura | 725/81 |
| 2005/0275758 A1 | 12/2005 | McEvilly et al. | |
| 2006/0015580 A1 | 1/2006 | Gabriel et al. | |
| 2006/0064757 A1 | 3/2006 | Poslinski | |
| 2006/0080703 A1 | 4/2006 | Compton | |
| 2006/0259927 A1 | 11/2006 | Acharya et al. | |
| 2007/0040890 A1 | 2/2007 | Morioka et al. | |
| 2007/0067817 A1 | 3/2007 | Hamilton et al. | |
| 2007/0237330 A1 | 10/2007 | Srivastava | |
| 2007/0240192 A1 * | 10/2007 | Acharya et al. | 725/87 |
| 2007/0276926 A1 | 11/2007 | LaJoie et al. | |
| 2008/0005770 A1 | 1/2008 | Acharya et al. | |
| 2008/0059533 A1 | 3/2008 | Krikorian | |
| 2008/0060035 A1 | 3/2008 | Tsang et al. | |
| 2008/0129864 A1 | 6/2008 | Stone et al. | |
| 2008/0162713 A1 | 7/2008 | Bowra et al. | |
| 2008/0267108 A1 | 10/2008 | Zhang et al. | |
| 2008/0301750 A1 * | 12/2008 | Silfvast et al. | 725/131 |
| 2008/0307478 A1 | 12/2008 | Kim et al. | |
| 2009/0007190 A1 * | 1/2009 | Weber et al. | 725/67 |
| 2009/0036147 A1 | 2/2009 | Romano | |
| 2009/0083792 A1 | 3/2009 | Narita | |
| 2009/0113492 A1 | 4/2009 | Norin et al. | |
| 2009/0172685 A1 | 7/2009 | Shavit | |
| 2009/0196371 A1 | 8/2009 | Yamamoto et al. | |
| 2009/0222875 A1 | 9/2009 | Cheng et al. | |
| 2009/0268835 A1 | 10/2009 | Imai et al. | |
| 2009/0317065 A1 | 12/2009 | Fyock et al. | |
| 2010/0009638 A1 | 1/2010 | Saito | |
| 2010/0125888 A1 * | 5/2010 | Jerram | 725/116 |
| 2010/0231354 A1 | 9/2010 | Nishiguchi et al. | |
| 2010/0281042 A1 | 11/2010 | Windes et al. | |
| 2010/0319044 A1 | 12/2010 | Agans et al. | |
| 2011/0247061 A1 | 10/2011 | Loveland et al. | |
| 2012/0127363 A1 | 5/2012 | Kanojia et al. | |
| 2012/0127374 A1 | 5/2012 | Kanojia et al. | |
| 2012/0129479 A1 | 5/2012 | Kanojia et al. | |
| 2012/0131621 A1 | 5/2012 | Kanojia et al. | |
| 2012/0266198 A1 | 10/2012 | Kanojia et al. | |
| 2012/0266201 A1 | 10/2012 | Kanojia et al. | |
| 2013/0191858 A1 | 7/2013 | Kanojia et al. | |
| 2013/0273974 A1 * | 10/2013 | Lea et al. | 455/562.1 |

FOREIGN PATENT DOCUMENTS

| | | |
|---|---|---|
| JP | 2010273298 | 12/2010 |
| WO | 2006014739 A2 | 2/2006 |
| WO | 2006107350 A1 | 10/2006 |
| WO | 2007064380 A1 | 6/2007 |
| WO | 2009071132 A1 | 6/2009 |
| WO | 2010030627 A1 | 3/2010 |
| WO | 2012/068395 A1 | 5/2012 |

OTHER PUBLICATIONS

International Search Report, mailed Aug. 7, 2012, from International Application No. PCT/US2012/025676, filed Feb. 17, 2012.
Boudier, T. et al., "VIDOS, a system for video editing and format conversion over the Internet," Computer Networks, vol. 34, 2000, pp. 931-944.
Wheeler, H. A., "Fundamental Limitations of Small Antennas," Proceedings of the IRE, vol. 35, Dec. 1947, pp. 1479-1484.
"Apple vs. Google: The Stakes are Rising," The Wall Street Journal, accessed on Feb. 10, 2012.
International Search Report, mailed Nov. 2, 2012, from International Application No. PCT/US2012/025707, filed Feb. 17, 2012.
Partial International Search Report, mailed Jun. 6, 2012, from International Application No. PCT/US2012/025658, filed Feb. 17, 2012.
SplashCast is Social TV, downloaded from Internet on Sep. 6, 2011.
International Preliminary Report on Patentability, mailed May 8, 2014, from counterpart International Application No. PCT/US2012/061717, filed Oct. 24, 2012.
International Search Report mailed Jan. 23, 2013 from counterpart International Application No. PCT/US2012/061717, filed Oct. 24, 2012.

* cited by examiner

METHOD AND SYSTEM FOR ASSIGNING ANTENNAS IN DENSE ARRAY

RELATED APPLICATIONS

This application claims the benefit under 35 U.S.C. §119 (e) of U.S. Provisional Application No. 61/551,756, filed on Oct. 26, 2011, which is incorporated herein by reference in its entirety.

BACKGROUND OF THE INVENTION

Recently, systems including arrays of small radio frequency (RF) antennas have been implemented for capturing over the air content, such as broadcast television. The systems then stream the captured content to users via a public network, such as the Internet. An example of a system for capturing and streaming over the air content to users via the Internet is described in, "System and Method for Providing Network Access to Antenna Feeds" by Kanojia et al., filed Nov. 17, 2011, U.S. patent application Ser. No. 13/299,186, (U.S. Pat. Pub. No.: US 2012/0127374 A1), which is incorporated herein by reference in its entirety.

In typical capture systems, each user is assigned their own antenna element. Thus, the systems generally include two dimensional arrays having large numbers of physically small antenna elements. In order to maximize the number of antenna elements at installation locations, the two dimensional arrays are preferably deployed in three dimensional arrays. The three dimensional arrays are created by implementing the two dimensional arrays on antenna array cards, and then installing multiple antenna array cards in close proximity.

SUMMARY OF THE INVENTION

Because the antenna elements are physically small and the arrays are preferably dense, the systems should be located physically near to the television transmitters. This ensures a strong signal and compensates for the low gain characteristics of the small antennas and any other attenuation effects due to the density of the arrays.

Nevertheless, user requests for content should be assigned to antenna elements in an optimal way. Unlike antenna elements in a phased array, it is not desirable to have multiple antenna elements competing over the same incident power. Additionally, it is not desirable to have antenna elements blocking lines of sights of other antenna elements tuned to receive same or similar channels. In general, the channels refer to frequency ranges within the RF spectrum that correspond to designated broadcast television channels. For example, in the United States channel 2 is broadcast between 54-60 MegaHertz (MHz), channel 3 is broadcast between 60-66 MHz, and channel 4 is broadcast between 66-72 MHz. To minimize coupling between antenna elements, user requests are not randomly assigned within the array. Instead, user requests are selectively assigned to antenna elements based on which channels are requested by the users and to which channels the other antenna elements are already tuned.

In general, according to one aspect, the invention features a method of assigning antenna elements of an antenna array. The method includes receiving user requests for content broadcast by broadcasting entities on channels. The method further includes assigning the user requests to the antenna elements of the antenna array to minimize coupling with other antenna elements based on the channels of the content for the user requests and the channels to which the other antenna elements are tuned.

In general, according to another aspect, the invention features a system for capturing content broadcast by broadcasting entities. The system includes an array of antenna elements for receiving user requests for the content broadcast by the broadcasting entities on channels. The system further includes an antenna controller that assigns the user requests to the antenna elements of the antenna array to minimize coupling with other antenna elements based on the channels of the content for the user requests and the channels to which the other antenna elements are tuned.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of nouns and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
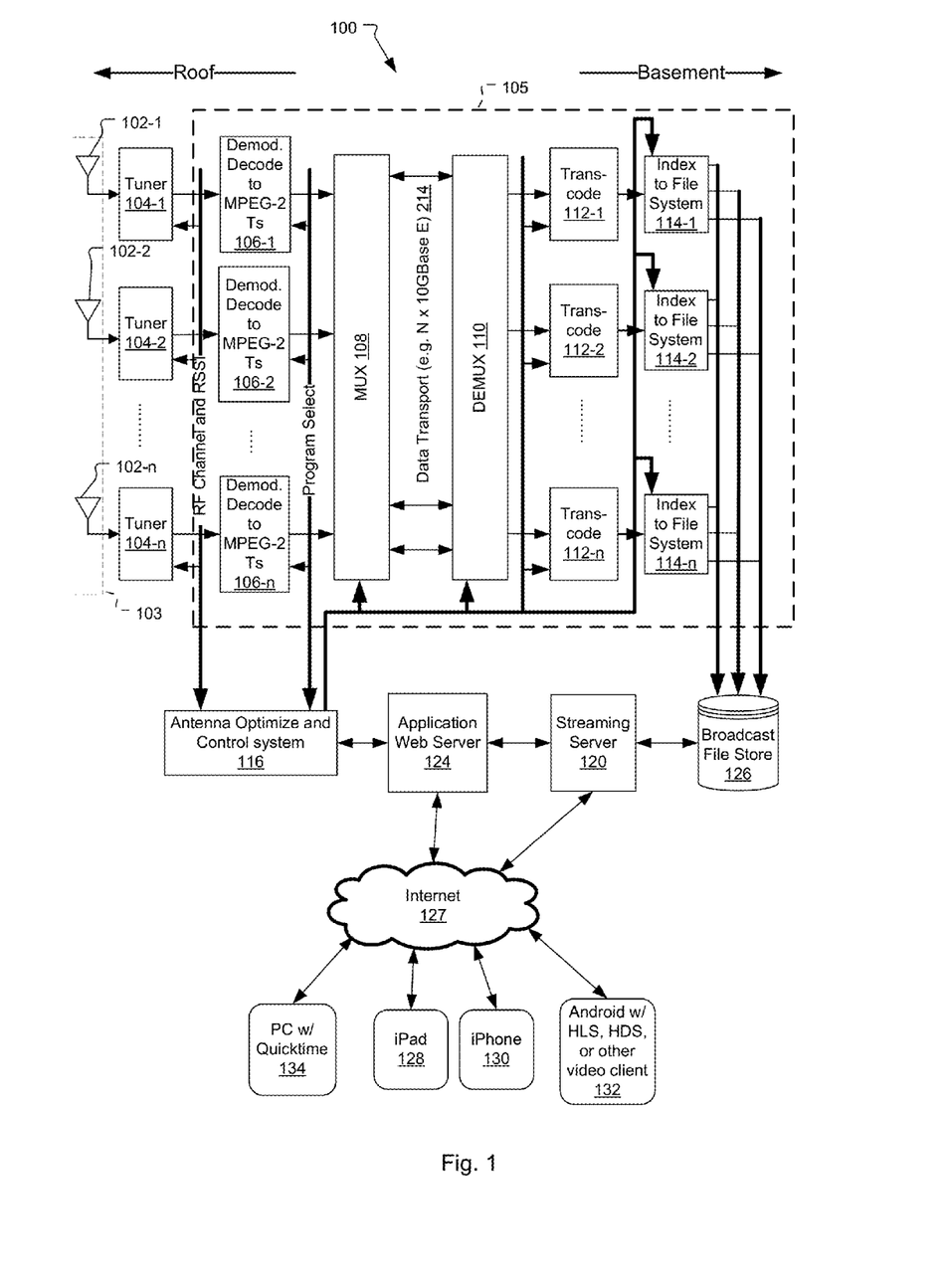
FIG. 1 is a block diagram illustrating a system for the capture and distribution of over the air content.

FIG. 1 shows a capture system 100 that enables individual users to receive terrestrial television content transmissions captured by antenna elements and streamed to the users, which has been constructed according to the principles of the present invention. The system 100 allows each user to separately access the feed from a separate antenna element for recording or live streaming of content transmissions.

In a typical implementation, users access the system 100 via packet network(s), which can be private and/or public, such as the Internet 127, with client devices 128, 130, 132, 134. In one example, the client device is a personal computer 134 that accesses the system 100 via a browser. In other examples, the system 100 is accessed by mobile devices such as a tablet or slate computing device, e.g., iPad mobile computing device, or a mobile phone, e.g., iPhone mobile computing device or mobile computing devices running the Android operating system by Google, Inc. Other examples of client devices are televisions that have network interfaces and browsing capabilities. Additionally, many modern game consoles and some televisions also have the ability to run third-party software and provide web browsing capabilities that can be employed to access the video from the system 100 over a network connection.

The broadcast content is often displayed using HTML-5 or with a media player executing on the client devices such as QuickTime by Apple Corporation, Windows Media Player by Microsoft Corporation, iTunes by Apple Corporation, or Winamp Media Player by Nullsoft Inc., to list a few examples that are common as of the writing of this document.

An application web server (or application server) 124 manages requests or commands from the client devices 128, 130, 132, 134. The application server 124 enables the users on the client devices 128, 130, 132, 134 to select whether they want to access previously recorded content transmission, set up recordings of future content transmissions, or watch live broadcast television programs in realtime. In some examples, the system 100 also enables users to access and/or record radio (audio-only) broadcasts.

If the users request to watch previously recorded content transmissions, then the application server 124 sends the request of the user to a streaming server 120, which retrieves each users' individual copy of the previously recorded content transmission from a broadcast file store (or file store) 126, if that is where it is resident, and streams the content to the client device 128, 130, 132, 134 from which the request originated. If the users request to set up future recordings of content transmissions such as television programs, the application server 124 communicates with an antenna optimization and control system 116 to configure broadcast capture resources to capture and record the desired content transmissions by reserving antenna and encoding resources for the time and date of the future recording. If the users request to watch live broadcast television programs in realtime, the antenna optimization and control system 116 identifies antenna resources available for immediate assignment.

In current embodiments, streaming content is temporarily stored or buffered in the streaming server 120 and/or the broadcast file store 126 prior to playback and streaming to the users whether for live streaming or future recording. This buffering allows users to pause, rewind, and replay parts of the television program.

In one implementation, the antenna optimization and control system 116 maintains the assignment of this antenna element to the user throughout any scheduled television program or continuous usage until such time as the user releases the antenna element by closing the session or by the expiration of a predetermined time period as maintained by a timer implemented in the antenna optimization and control system 116. An alternative implementation would have each antenna element assigned to a particular user for the user's sole usage. In an alternative implementation, users are assigned new antenna elements whenever the users request a different live broadcast.

Figure 2:
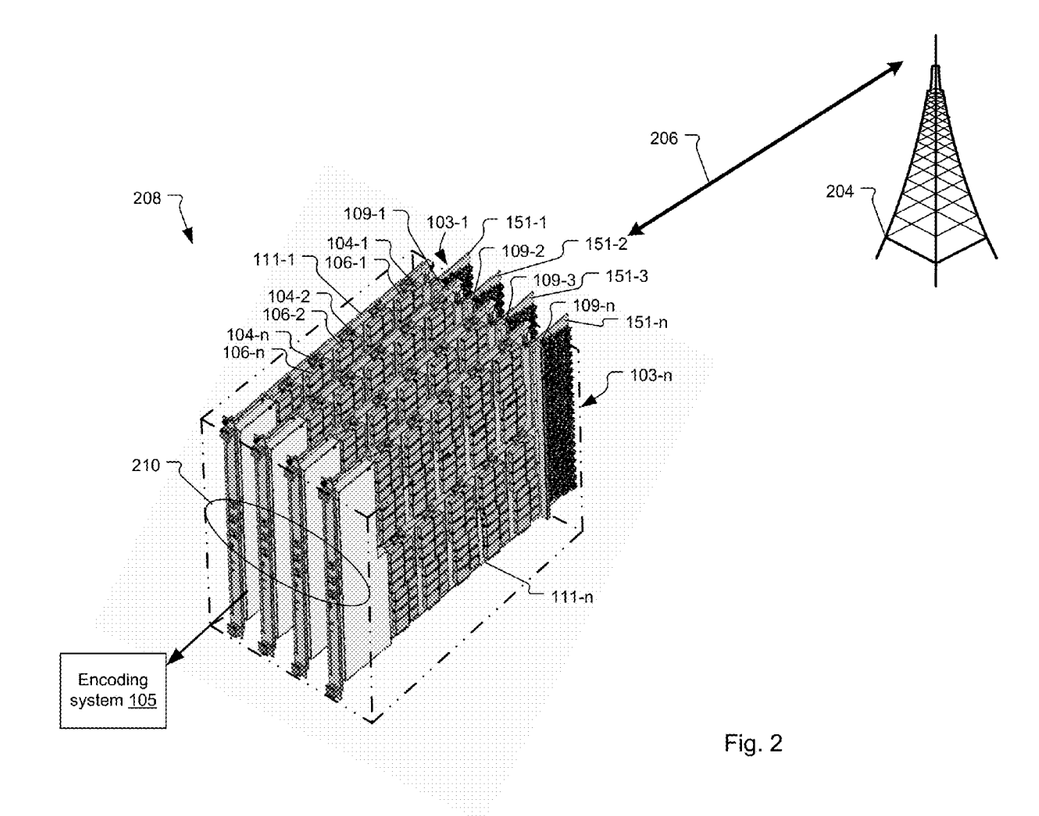
FIG. 2 is a schematic perspective view of a three dimensional antenna array including a card cage structure shown in phantom, which functions as an enclosure for the antenna array cards.

The broadcast capture portion of the system 100 includes an array 103 of antenna elements 102-1, 102-2 . . . 102-$n$. Each of these antenna elements 102-1, 102-2 . . . 102-$n$ is a separate antenna element that is capable of capturing different terrestrial television content broadcasts and, through a digitization and encoding pipeline, separately process those broadcasts for storage and/or live streaming to the client devices 128, 130, 132, 134. This configuration allows the simultaneous recording of over the air broadcasts from different broadcasting entities for each of the users. In the illustrated example, only one array of antenna elements 103 is shown. In a typical implementation, however, multiple three dimensional arrays are used, and in some examples, the arrays are organized into groups of three dimensional arrays. An example of a three dimensional array is shown in FIG. 2.

The antenna optimization and control system 116 determines which antenna elements 102-1 to 102-$n$ within the antenna array 103 are available and optimized to receive the particular over the air broadcast content transmissions requested by the users. In a preferred embodiment, the antenna optimization and control system 116 implements an assignment algorithm that optimally assigns users requests to antenna elements 102-1 to 102-$n$ to minimize the amount of coupling between the antenna elements 102-1 to 102-$n$.

In a typical implementation, the assignment algorithm avoids assigning user requests to antenna elements if the assigned antenna elements will be blocked by other antenna elements tuned to the same or similar channel. Additionally, if the assigned antenna elements must be tuned to the same or similar channel as other adjacent antenna elements, then the antenna optimization and control system 116 assigns user requests to antenna elements that traditionally have had lower coupling when assigned near other antenna elements tuned to the same or similar channel.

Typically, coupling between antenna elements 102-1 to 102-$n$ of the array 103 is determined for a specific frequency (i.e., channel) F and antenna element E. To minimize coupling between antenna elements, the linear distance between antenna elements tuned to the same or similar frequency should be maximized. Thus, in one embodiment the linear distance between antenna elements E tuned to the same frequency F is calculated by: $\|E \text{ sub } F - E_{adj} \text{ sub } F\|$.

Alternatively, another method to minimize coupling is to generate a histogram (or distribution) of new user requests plus users currently assigned to antenna elements 102-1 to 102-n for each channel. The channel with the largest total number of new user requests plus currently assigned users will be the most constrained channel. This channel is the most constrained channel because as more users are assigned to the same (or similar) channel, it becomes more difficult to maximize the distance between antenna elements. Thus, the user requests for this channel are assigned to antenna elements first.

The antenna optimization and control system 116 then assigns user requests to antenna elements 102-1 to 102-n for the next most constrained channel until all the user requests are assigned to antenna elements. This method will not always maximize linear distance between antenna elements tuned to the same (or similar) frequency, but the method is generally able to adequately minimize coupling to acceptable levels within the array 103.

In an alternative embodiment, determination of optimized antennas is accomplished by comparing received signal strength indicator (RSSI) values of different antenna elements. RSSI is a measurement of the power of a received or incoming radio frequency signal. Thus, the higher the RSSI value, the stronger the received signal.

In yet another alternative embodiment, the antenna optimization and control system 116 determines the best available antenna using Modulation Error Ratio (MER). Modulation Error Ratio is used to measure the performance of digital transmitters (or receivers) that are using digital modulation. In short, the antenna element that has the best MER for the desired channel is select to be assigned to receive that channel.

In still other alternative embodiments, other methods to minimize coupling, which calculate an inverse of the linear distances squared, could also be implemented.

In a typical implementation, coupling is further minimized by considering known characteristics of the antenna elements. Some examples of the known characteristics of antenna elements include bandwidth of the antenna elements ($BW_E$), the tuned frequencies of the antenna elements ($F_E$), a direction from an identified antenna element to an adjacent antenna element ($DIR_{E,Eadj}$), a distance between the identified antenna element and an adjacent antenna element, $DIS_{E,Eadj}$, and a modified effective aperture ($A_{em,E}$) of the antenna element, to list a few examples. The effective aperture approximates the minimum catchment area of a field of the antenna elements to a first order. And the modification of the effective aperture removes the loss in the antenna element artificially. Generally, the catchment area that should be kept clear is a function of $X*A_{em,E}$, where the shape of the effective aperture needs to be defined. In a typical implementation, "X" is a constant determined by the characteristics of the antenna elements. Generally, the value of X should be greater than one.

Additionally, coupling between antenna elements is often the result of the near field environment found in the arrays of antenna elements. In some implementations, the coupling is more dependent on the field strength than power and often has a $1/r^3$ characteristic about the identified antenna element, in one example. In another example, the coupling has a $1/r^2$ characteristic about the identified element, which is different than the field characteristic of $1/r$. Lastly, coupling is also typically directional and some antenna elements are prone to coupling based on geometries.

After identifying an antenna element with adequately minimized coupling, the antenna optimization and control system 116 assigns the user requests to the antenna elements 102-1 to 102-n. The antenna optimization and control system 116 then signals corresponding RF tuners 104-1 to 104-n to tune the assigned antenna elements to receive the requested broadcasts.

The received broadcasts from each of the antenna elements 102-1 to 102-n and their associated tuners 104-1 to 104-n are transmitted to an encoding system 105 as content transmissions. The encoding system 105 is comprised of encoding components that create parallel processing pipelines for each allocated antenna 102-1 to 102-n and tuner 104-1 to 104-n pair.

The encoding system 105 demodulates and decodes the separate content transmissions from the antennas 102-1 to 102-n and tuners 104-1 to 104-n into MPEG-2 format using an array of ATSC (Advanced Television Systems Committee) decoders 106-1 to 106-n assigned to each of the processing pipelines. In a situation where each broadcast carrier signal contains multiple content transmissions, the antenna optimization and control system 116 signals the ATSC decoders (or demodulators) 106-1 to 106-n to select the desired program contained on the carrier signal. The content transmissions are decoded to MPEG-2 content transmission data because it is currently a standard format for the coding of moving pictures and associated audio information.

The content transmission data from the ATSC decoders 106-1 to 106-n are sent to a multiplexer 108. The content transmissions are then transmitted across an antenna transport interconnect to a demultiplexer switch 110. In a preferred embodiment, the antenna transport interconnect is an n×10 GbE optical data transport layer.

The content transmission data of each of the antenna processing pipelines are then transcoded into a format that is more efficient for storage and streaming. In the current implementation, the transcode to the MPEG-4 (also known as H.264) format is effected by an array of transcoders 112-1 to 112-n. Typically, multiple transcoding threads run on a single signal processing core, SOC (system on a chip), FPGA or ASIC type device.

The content transmission data are transcoded to MPEG-4 format to reduce the bitrates and the sizes of the data footprints. As a consequence, the conversion of the content transmission data to MPEG-4 encoding will reduce the picture quality or resolution of the content, but this reduction is generally not enough to be noticeable for the average user on a typical reduced resolution video display device. The reduced size of the content transmissions will make the content transmissions easier to store, transfer, and stream to the user devices. Similarly, audio is transcoded to AAC in the current embodiment, which is known to be highly efficient.

In one embodiment, the transcoded content transmission data are sent to a packetizers and indexers 114-1, 114-2 . . . 114-n of the pipelines, which packetize the data. In the current embodiment, the packet protocol is UDP (user datagram protocol), which is a stateless, streaming protocol.

Also, in this process, time index information is added to the content transmissions. The content data are then transferred to the broadcast file store 126 for storage to the file system, which is used to store and/or buffer the content transmissions as content data for the various content transmission, e.g., television programs, being captured by the users.

In typical embodiments, the content data are streamed to the users with HTTP Live Streaming or HTTP Dynamic Streaming. These are streaming protocols that are dependent upon the client device. HTTP Live Streaming is a HTTP-based media streaming communications protocol implemented by Apple Inc. as part of its QuickTime X and iPhone software systems. The stream is divided into a sequence of HTTP-based file downloads. HDS over TCP/IP is another option. This is an adaptive streaming communications protocol by Adobe System Inc. HDS dynamically switches between streams of different quality based on the network bandwidth and the computing device's resources. Generally, the content data are streamed using Hypertext Transfer Protocol (HTTP) or Hypertext Transfer Protocol Secure (or HTTPS). HTTPS combines HTTP with the security of Transport Layer Security/Secure Sockets Layer (or TLS/SSL). TLS/SSL are security protocols that provide encryption of data transferred over the Internet.

FIG. 2 is a schematic perspective view of an exemplary card cage 208, which is shown in phantom. The card cage 208 functions as an enclosure to house antenna array cards 151-1 to 151-n to create a three-dimensional array of antenna elements 102-1 to 102-n. The three dimensional array is comprised of multiple two dimensional antenna arrays 103-1 to 103-n.

The sides, top, bottom and front walls of the card cage 208 are fabricated from a conductive material to maximize Faraday shielding of the antenna elements from the active electronics. The front wall of the card cage provides an open port as the boresight 206 of the antenna arrays 103-1 to 103-n and faces the television transmitter 204 of the broadcasting entity. Some examples of broadcasting entities include The American Broadcasting Company (ABC), The National Broadcasting Company (NBC), and CBS broadcasting corporation (CBS). The rear wall of the card cage 208 includes data transport interfaces 210 that connect the antenna array cards 151-1 to 151-n to the remainder of the encoding system 105.

In a current embodiment, each antenna array 103-1 to 103-n includes 80 antenna elements that are located outside the Faraday shielding of the card cage 208. Typically, the antenna elements are dual loop antennas. Thus, in the current embodiment with 80 antenna elements, there are 160 loop antennas. In alternative embodiments, as many as 320 antenna elements (640 loops antennas) or possibly 640 antenna elements (1280 loops antennas) are installed on each antenna array card 151-1 to 151-n. Each antenna is approximately 0.5 inches in height, 0.5 inches wide, or about 1 centimeter (cm) by 1 cm, and has a thickness of approximately 0.030 inches, or about a 1 millimeter (mm). In terms of the antenna elements, when configured as a square loop, the 3 sided length is preferably less than 1.7 inches (4.3 cm), for a total length of all 4 sides being 2.3 inches, (5.8 cm).

Air dams 109-1 to 109-n divide the antenna arrays 103-1 to 103-n from the tuner demodulator sections 111-1 to 111-n. The air dams 109-1 to 109-n act to block the airflow for the antenna array cards 151-1 to 151-n and fill in the gap between the cards such that the air dam of each card engages the backside of its adjacent card. Additionally, the air dams 109-1 to 109-n also act as part of the Faraday shields to reduce electromagnetic interference (EMI) between the tuner and demodulator sections 111-1 to 111-n and the antenna arrays 103-1 to 103-n.

Tuners 104-1 to 104-n and demodulators 106-1 to 106-n are mounted on the tuner and demodulator sections 111-1 to 111-n of the antenna array cards 151-1 to 151-n. The tuners 104-1 to 104-n tune the antenna of the antenna arrays 103-1 to 103-n to capture over the air content broadcast by the one or more television transmitters 204. The captured over the air content (or content transmissions) are then demodulated into MPEG-2 format as content transmission data by the demodulators 106-1 to 106-n.

Typically, the antenna array cards 151-1 to 151-n are orientated vertically, with the antenna elements horizontal to create a horizontally polarized (Electric Field) half omni-directional antenna array. Additionally, the antenna elements protrude out of the front of card cage 208 to further help reduce interference between the components (e.g., tuner and demodulators) and the antenna arrays 103-1 to 103-n.

Alternatively, if over the air content from the broadcasters has a vertical polarization, which occurs in some locales, then orientation of the antenna array cards 151-1 to 151-n and antennas should be changed accordingly. The illustrated example shows the orientation of the antennas for broadcasters with horizontal polarization.

Figure 3:
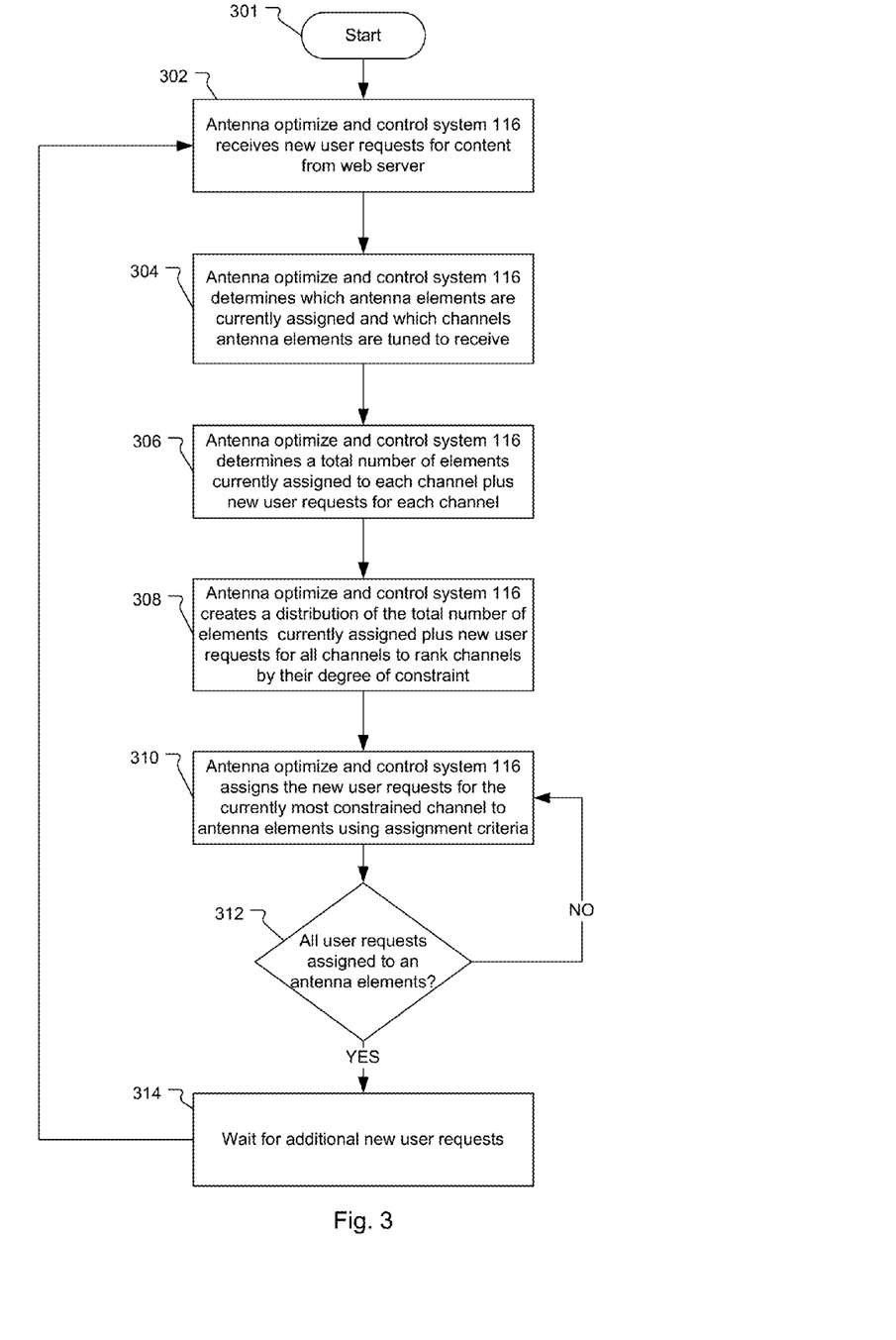
FIG. 3 is a flow chart illustrating the steps performed by an antenna optimize and control system to assign user requests to antenna elements to minimize the amount of coupling between antenna elements.

FIG. 3 is a flow chart illustrating the steps performed by the antenna optimize and control system 116 to assign user requests to antenna elements and to minimize the amount of coupling between antenna elements.

In the first step 302, the antenna optimize and control system 116 receives and accumulates new user requests for content from the application server 124. In the next step 304, the antenna optimize and control system 116 determines which antenna elements are currently assigned to users and which channels the antenna elements 102-1 to 102-n are tuned to receive.

In the next step 306, the antenna optimize and control system 116 determines a total number of antenna elements currently assigned to each channel plus new user requests for each channel. In the next step 308, the antenna optimize and control system 116 creates a histogram (or distribution) of the total number of antenna elements currently assigned plus new user requests for all channels to enable the antenna optimize and control system 116 to rank the channels by their degree of constraint.

Next, the antenna optimize and control system 116 assigns the new user requests for the currently most constrained channel to antenna elements using assignment criteria in step 310. In the next step 312, the antenna optimize and control system 116 determines if all user requests are assigned to antenna elements.

If all the user requests are not assigned to antenna elements, then the antenna optimize and control system assigns the new user requests for the currently most constrained channel to antenna elements using assignment criteria in step 310. If all user requests are assigned to antenna elements then the antenna optimize and control system 116 waits for additional user requests in step 314.

Figure 4:
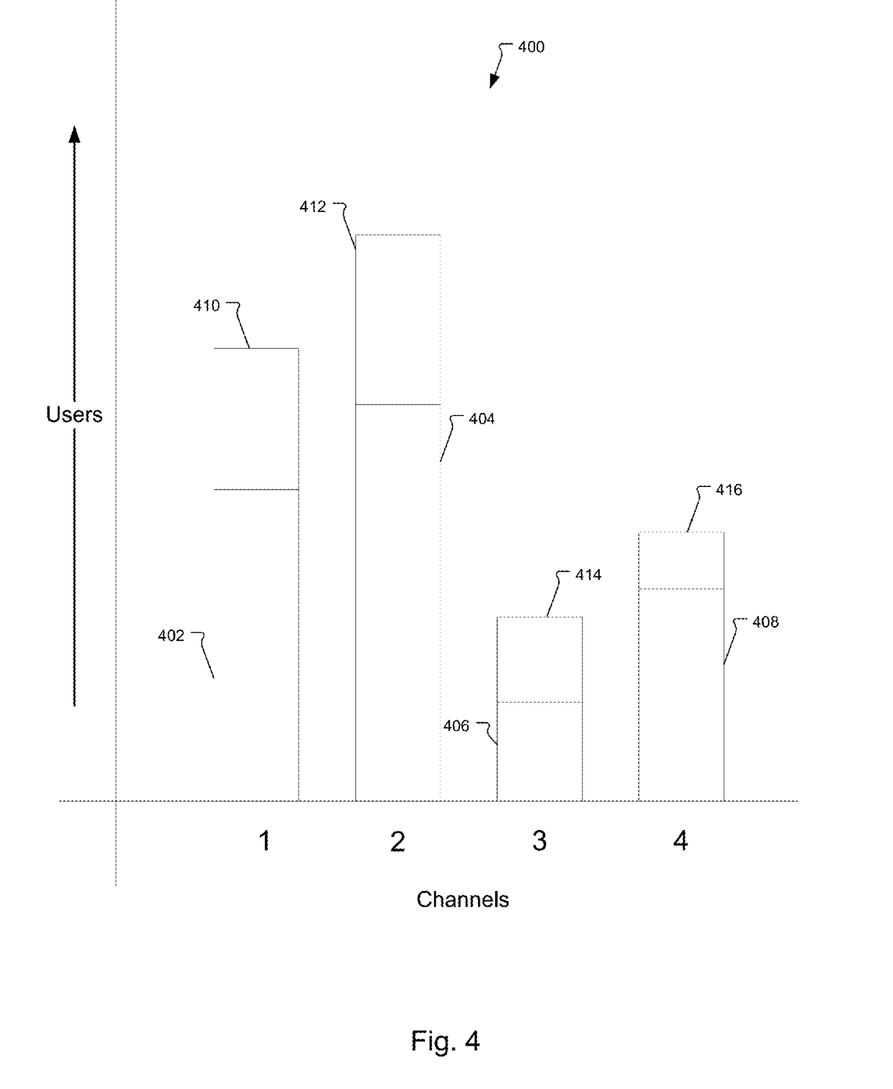
FIG. 4 is a histogram of users currently assigned to antenna elements and new user requests for content for each channel.

FIG. 4 shows an example of a histogram of the current users assigned to antenna elements and new user requests.

In the illustrated example, reference numerals 402, 404, 406 and 408 represent users currently assigned to antenna elements and accessing channels 1 to 4, respectively. Similarly, reference numerals 410, 412, 414, and 416 represent the new user requests to view channels 1 to 4, respectively. Because channel 2 has the largest total number of currently assigned users and new users requests, the new user requests to view channel 2 will be the most difficult to assign while minimizing coupling. Thus, the new user requests for channel 2 are assigned to antenna elements 102-1 to 102-n first.

After all the user requests for channel 2 have been assigned to antenna elements, the antenna optimize and control 116 determines which channel is the next most constrained and then assigns users requests to antenna elements for that channel. The antenna optimize and control 116 then repeats this process of assigning user requests to antenna elements based on the degree of constraint until all user requests have been assigned to an antenna element.

Figure 5A:
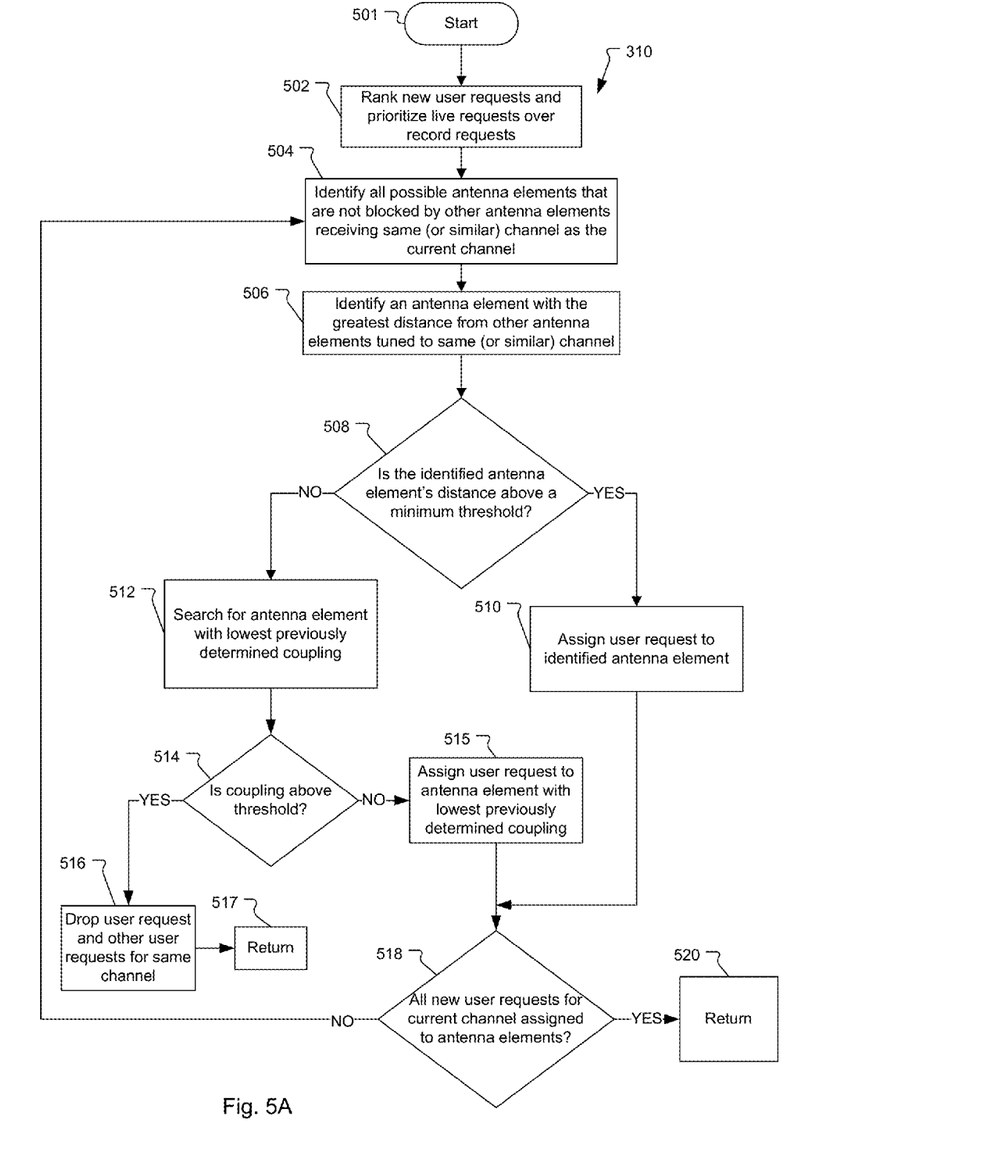
FIG. 5A is a flow chart illustrating the assignment criteria that are implemented by the antenna optimize and control system to optimally assign user requests to antenna elements with the greatest distance from other elements tuned to the same or similar channel.

FIG. 5A is a flow chart illustrating the assignment criteria that are implemented to optimally assign user requests to antenna elements based on antenna elements with the greatest distance from other elements tuned to the same/similar channel.

In the first step 502, the antenna optimize and control system 116 ranks new user requests and prioritizes live requests over requests record content. The live requests are generally prioritized over requests to record content because the live requests are from client devices requesting realtime viewing. Conversely, the requests to schedule recordings may or may not be viewed at a later time.

Next, the antenna optimize and control system 116 identifies all possible antenna elements that are not blocked by other antenna elements receiving same (or similar) channel as the current channel in step 504.

In the next step 506, the antenna optimize and control system 116 identifies an antenna element with the greatest distance from other antenna elements tuned to the same/similar channel. In the next step 508, the antenna optimize and control system 116 determines if the identified antenna element's distance is above a minimum distance threshold.

If the identified antenna element's distance is above a minimum threshold, then the antenna optimize and control system 116 assigns the user request to the identified antenna in step 510. If the identified antenna element's distance is not above a minimum threshold, then the antenna optimize and control system 116 searches for an antenna element with lowest previously determined coupling in step 512.

In the next step 514, the antenna optimize and control system 116, determines if coupling is above a coupling threshold. If the coupling is not above the threshold, then the antenna optimize and control system 116 assigns the user request to the antenna element with lowest previously determined coupling in step 515. In the next step 518, the antenna optimize and control system 116 determines if all new user requests for current channel are assigned to antenna elements in step 518.

If all new user requests for current channel are not assigned to antenna elements, then the antenna optimize and control system 116 returns to step 504 to identify all possible antenna elements that are not blocked by other antenna elements receiving same (or similar) channel as the current channel.

Returning to step 514, if the coupling is above the threshold, then the antenna optimize and control system 116 drops the user request and other user requests for the same channel in step 516. This prevents the system 100 from assigning too many user requests to the same channel and adversely affecting all of the antenna elements (and users) of the system 100.

Figure 5B:
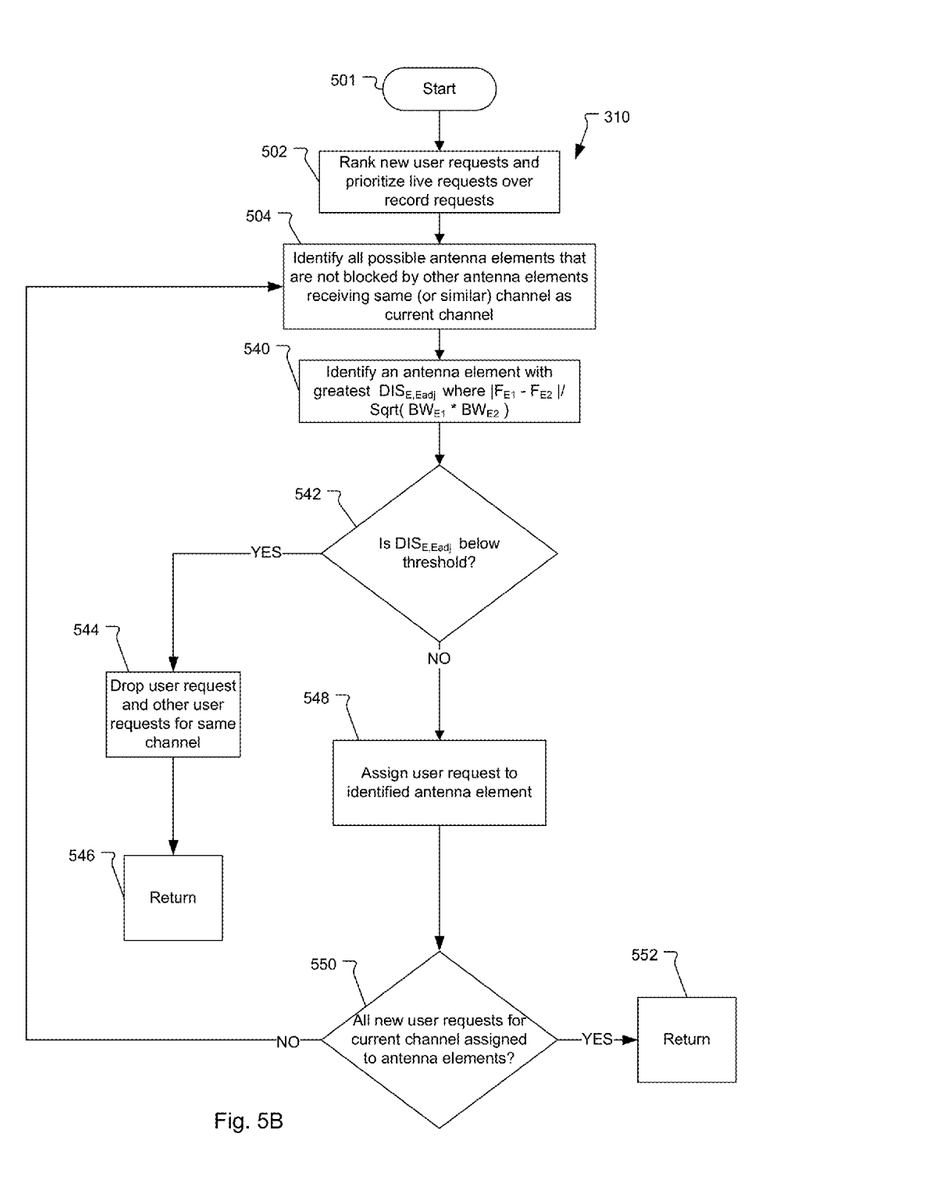
FIG. 5B is a flow chart illustrating alternative assignment criteria to optimally assign user requests to antenna elements with the greatest distance between an identified antenna element and an adjacent antenna element.

FIG. 5B is a flow chart illustrating alternative assignment criteria to optimally assign user requests to antenna elements with the greatest distance between an identified antenna element and an adjacent antenna element.

Steps 502 and 504 are the same as previously described in FIG. 5A. Then, in step 540, the antenna optimize and control system 116 identifies an antenna element with the greatest distance between the identified antenna element and an adjacent antenna element taking into account the tuned frequencies of the elements and the bandwidths of the elements: ($DIS_{E,Eadj}$, where $|F_{E1}-F_{E2}|/\sqrt{BW_{E1}*BW_{E2}}$, in which $F_{E1}-F_{E2}$ is the difference in the tuned frequency between the two elements and $BW_{E1}*BW_{E2}$ is the product of the bandwidths of the two elements.

Next, the antenna optimize and control system 116 determines if $DIS_{E,Eadj}$ is below a threshold in step 542. If $DIS_{E,Eadj}$ is below the threshold, then the antenna optimize and control system 116 drops the user request and other user requests for same channel in step 544.

If $DIS_{E,Eadj}$ is not below the threshold, then the antenna optimize and control system 116 assigns the user requests to the identified antenna element in step 548. In the next step 550, the antenna optimize and control system 116 determines if all new user requests for current channel are assigned to antenna elements. If all new user requests for current channel are not assigned to antenna elements, then the antenna optimize and control system 116 returns to step 504 to identify all possible antenna elements that are not blocked by other antenna elements receiving same (or similar) channel as the current channel.

Figure 5C:
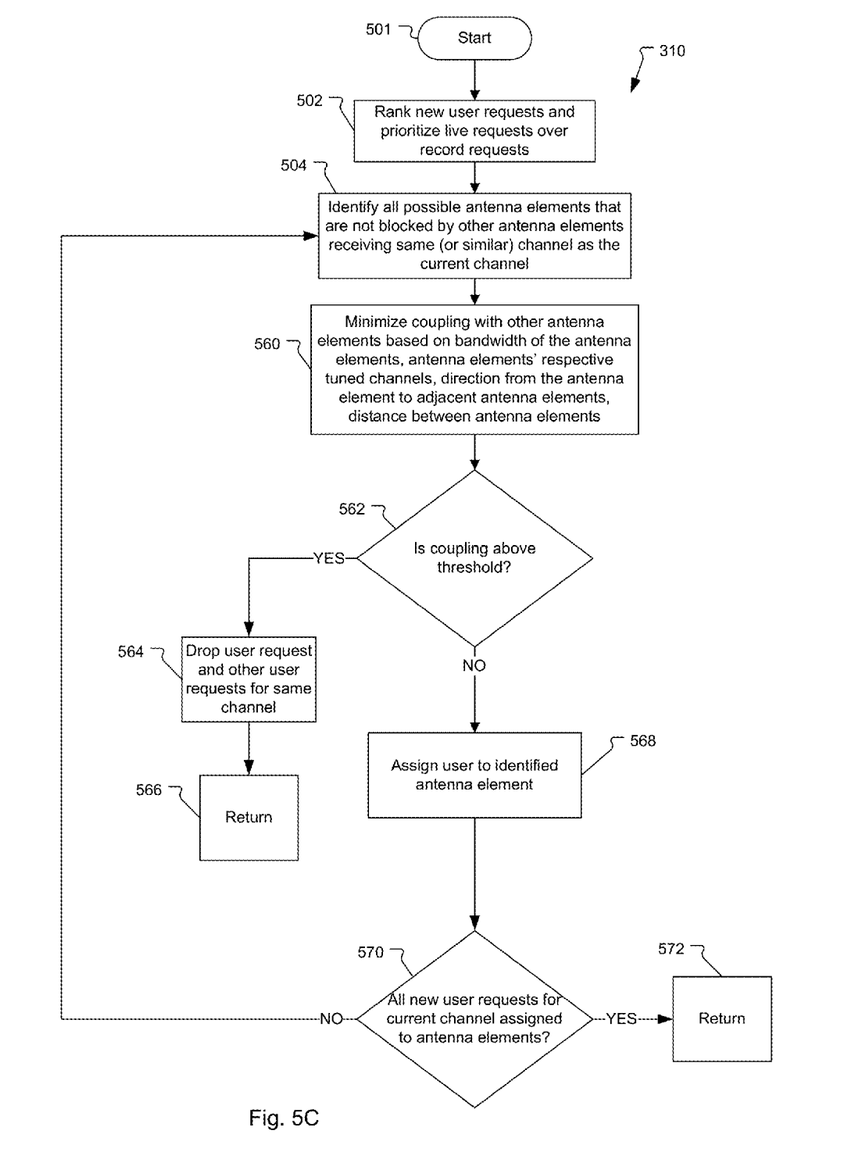
FIG. 5C is a flow chart illustrating alternative assignment criteria to optimally assign antenna elements with minimal coupling based on bandwidth of the antenna elements, the antenna elements respective tuned channels, direction from the antenna element to adjacent antenna elements, and distance between the antenna elements.

FIG. 5C is a flow chart illustrating the assignment criteria implemented by the antenna optimize and control system 116 to optimally assign antenna elements with minimal coupling based on the bandwidth of the elements, elements respective tuned channels, direction from the element to adjacent elements, distance between elements.

Steps 502 and 504 are the same as previously described for FIGS. 5A and 5B. In the next step 560, the antenna optimize and control system 116 minimizes coupling with other antenna elements based on bandwidth of the antenna elements, antenna elements respective tuned channels, direction from the antenna element to adjacent antenna elements, and distance between antenna elements.

In the next step 562, the antenna optimize and control system 116 determines if coupling is above a predefined threshold. If coupling is above the threshold, then the antenna optimize and control system 116 drops the user request and other user requests for same channel in step 564.

If coupling is not above the threshold, then the antenna optimize and control system 116 assigns the user requests to the identified antenna element in step 568.

In the next step 570, the antenna optimize and control system 116 determines if all new user requests for current channel are assigned to antenna elements. If all new user requests for current channel are not assigned to antenna elements, then the antenna optimize and control system 116 returns to step 504 to identify all possible antenna elements that are not blocked by other antenna elements receiving same (or similar) channel as the current channel.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of assigning antenna elements of an antenna array, the method comprising:
   receiving user requests for content broadcast by broadcasting entities on channels; and
   assigning the user requests to the antenna elements of the antenna array to minimize coupling with other antenna elements based on the channels of the content for the user requests and the channels to which the other antenna elements are tuned by assigning the user requests to the antenna elements to maximize distance from other antennas elements tuned to a same and/or similar channel.

2. The method according to claim 1, wherein the user requests include requests for live streaming content.

3. The method according to claim 2, wherein the user requests for content include requests to record content.

4. The method according to claim 3, further comprising prioritizing the user requests for the live streaming content before the user requests to record content.

5. The method according to claim 4, further comprising assigning the user requests for the live streaming content before assigning the user requests to record content.

6. A method of assigning antenna elements of an antenna array, the method comprising:
receiving user requests for content broadcast by broadcasting entities on channels; and
assigning the user requests to the antenna elements of the antenna array to minimize coupling with other antenna elements based on the channels of the content for the user requests and the channels to which the other antenna elements are tuned by assigning the user requests to the antenna elements based on bandwidths of the antenna elements, channels to which the other antenna elements are tuned, direction of the other antenna elements, polarization of the other antenna elements, and/or distance between the antenna elements.

7. A method of assigning antenna elements of an antenna array, the method comprising:
receiving user requests for content broadcast by broadcasting entities on channels;
assigning the user requests to the antenna elements of the antenna array to minimize coupling with other antenna elements based on the channels of the content for the user requests and the channels to which the other antenna elements are tuned; and
dropping users requests for channels if coupling between the assigned antenna elements to other antenna elements exceeds a predefined threshold.

8. A method of assigning antenna elements of an antenna array, the method comprising:
receiving user requests for content broadcast by broadcasting entities on channels;
assigning the user requests to the antenna elements of the antenna array to minimize coupling with other antenna elements based on the channels of the content for the user requests and the channels to which the other antenna elements are tuned; and
minimizing coupling with the other antenna elements by assigning the user requests to the antenna elements based on a direction between the antenna elements and other antennas elements tuned to a same and/or similar channel and a direction of a transmitter of the broadcasting entities.

9. A system for capturing content broadcast by broadcasting entities, the system comprising:
an array of antenna elements for receiving the content broadcast by the broadcasting entities on channels; and
an antenna controller that assigns the user requests to the antenna elements of the antenna array to minimize coupling with other antenna elements based on the channels of the content for the user requests and the channels to which the other antenna elements are tuned, wherein the antenna controller minimizes coupling with the other antenna elements by assigning the user requests to the antenna elements to maximize distance from other antennas elements tuned to a same and/or similar channel.

10. The system according to claim 9, wherein the user requests include requests for live streaming content.

11. The system according to claim 10, wherein the user requests for content include requests to record content.

12. The system according to claim 11, wherein the antenna controller prioritizes user requests for the live streaming content before the user requests to record content.

13. The system according to claim 12, wherein the antenna controller assigns the user requests for the live streaming content before assigning the user requests to record content.

14. A system for capturing content broadcast by broadcasting entities, the system comprising:
an array of antenna elements for receiving the content broadcast by the broadcasting entities on channels; and
an antenna controller that assigns the user requests to the antenna elements of the antenna array to minimize coupling with other antenna elements based on the channels of the content for the user requests and the channels to which the other antenna elements are tuned, wherein the antenna controller minimizes coupling with the other antenna elements by assigning the user requests to the antenna elements based on bandwidths of the antenna elements, channels to which the other antenna elements are tuned, direction of the other antenna elements, polarization of the other antenna elements, and/or distance between the antenna elements.

15. A system for capturing content broadcast by broadcasting entities, the system comprising:
an array of antenna elements for receiving the content broadcast by the broadcasting entities on channels;
an antenna controller that assigns the user requests to the antenna elements of the antenna array to minimize coupling with other antenna elements based on the channels of the content for the user requests and the channels to which the other antenna elements are tuned; and
an application server that drops users requests for channels if coupling between the assigned antenna elements coupling to other antenna elements exceeds a predefined threshold.

16. A system for capturing content broadcast by broadcasting entities, the system comprising:
an array of antenna elements for receiving the content broadcast by the broadcasting entities on channels; and
an antenna controller that assigns the user requests to the antenna elements of the antenna array to minimize coupling with other antenna elements based on the channels of the content for the user requests and the channels to which the other antenna elements are tuned, a direction between the antenna elements and other antennas elements tuned to a same and/or similar channel and a direction of a transmitter of the broadcasting entities.

* * * * *